(12) United States Patent
Thomas et al.

(10) Patent No.: US 8,091,842 B2
(45) Date of Patent: Jan. 10, 2012

(54) AUTOMATICALLY VARYING EQUIPMENT SUPPORT

(75) Inventors: Nigel Geoffrey Thomas, Queensland (AU); James Brett Hutchinson, Queensland (AU)

(73) Assignees: Nigel Geoffrey Thomas, Queensland (AU); James Brett Hutchinson, Queensland (AU)

( * ) Notice: Subject to any disclaimer, the term of this patent is extended or adjusted under 35 U.S.C. 154(b) by 799 days.

(21) Appl. No.: 11/719,442

(22) PCT Filed: Nov. 18, 2005

(86) PCT No.: PCT/AU2005/001745
§ 371 (c)(1),
(2), (4) Date: Sep. 2, 2008

(87) PCT Pub. No.: WO2006/053382
PCT Pub. Date: May 26, 2006

(65) Prior Publication Data
US 2009/0134303 A1    May 28, 2009

(30) Foreign Application Priority Data
Nov. 18, 2004  (AU) .............................. 2004906612

(51) Int. Cl.
*H02B 1/00* (2006.01)
(52) U.S. Cl. .................. 248/125.8; 248/349.1; 248/917; 361/679.07

(58) Field of Classification Search .............. 248/125.8, 248/349.1, 419, 917, 919, 920; 361/679.07
See application file for complete search history.

(56) References Cited

U.S. PATENT DOCUMENTS

| | | | | |
|---|---|---|---|---|
| 3,813,491 | A * | 5/1974 | Pennar | 348/827 |
| 5,749,556 | A * | 5/1998 | Matsuoka et al. | 248/349.1 |
| 6,102,355 | A * | 8/2000 | Rood | 248/425 |
| 6,124,892 | A * | 9/2000 | Nakano | 348/373 |
| 6,161,806 | A * | 12/2000 | Crosson | 248/118.3 |
| 6,231,020 | B1 * | 5/2001 | Willson | 248/349.1 |
| 6,655,645 | B1 | 12/2003 | Lu et al. | |
| 6,826,041 | B2 * | 11/2004 | Yu | 361/679.07 |
| 7,434,774 | B1 * | 10/2008 | Floersch et al. | 248/183.2 |
| 2004/0066612 | A1 | 4/2004 | Yu | |
| 2005/0194509 | A1 * | 9/2005 | Tsai et al. | 248/349.1 |
| 2007/0007401 | A1 * | 1/2007 | Corporation et al. | 248/125.7 |
| 2008/0185484 | A9 * | 8/2008 | Suzuki | 248/125.7 |

FOREIGN PATENT DOCUMENTS
EP    1662194 A1 *  5/2006
JP    2002-77775     3/2002
* cited by examiner

*Primary Examiner* — Terrell McKinnon
*Assistant Examiner* — Daniel J Breslin
(74) *Attorney, Agent, or Firm* — Occhiuti Rohlicek & Tsao LLP

(57) ABSTRACT

An equipment support (10) for supporting a piece of equipment (20). The equipment support (10) being operable to support the piece of equipment (20) and including a drive arrangement (13a, 13b) to provide drive so that the position of the piece of equipment (20) relative to a user of the equipment is automatically and continuous varied over time.

15 Claims, 9 Drawing Sheets

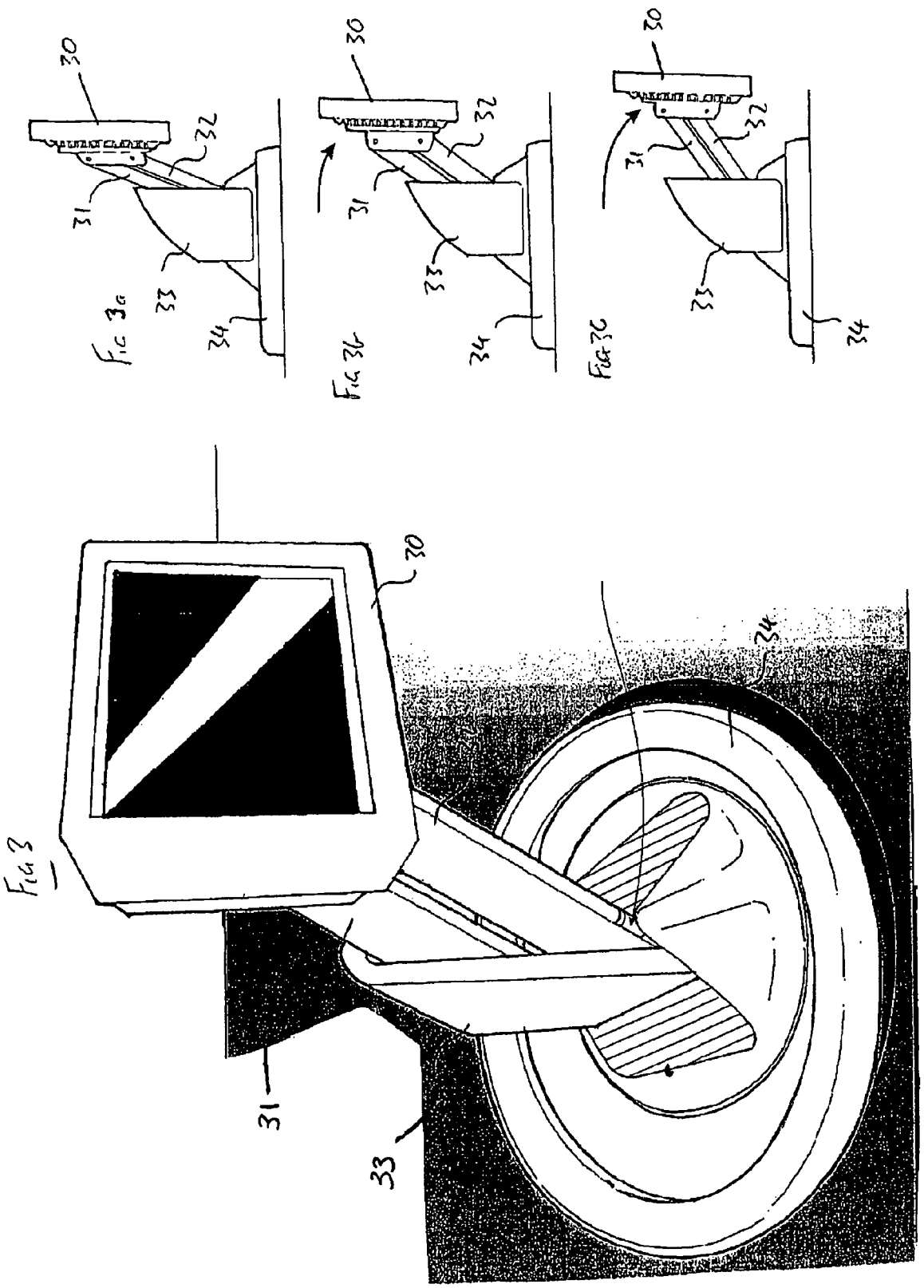

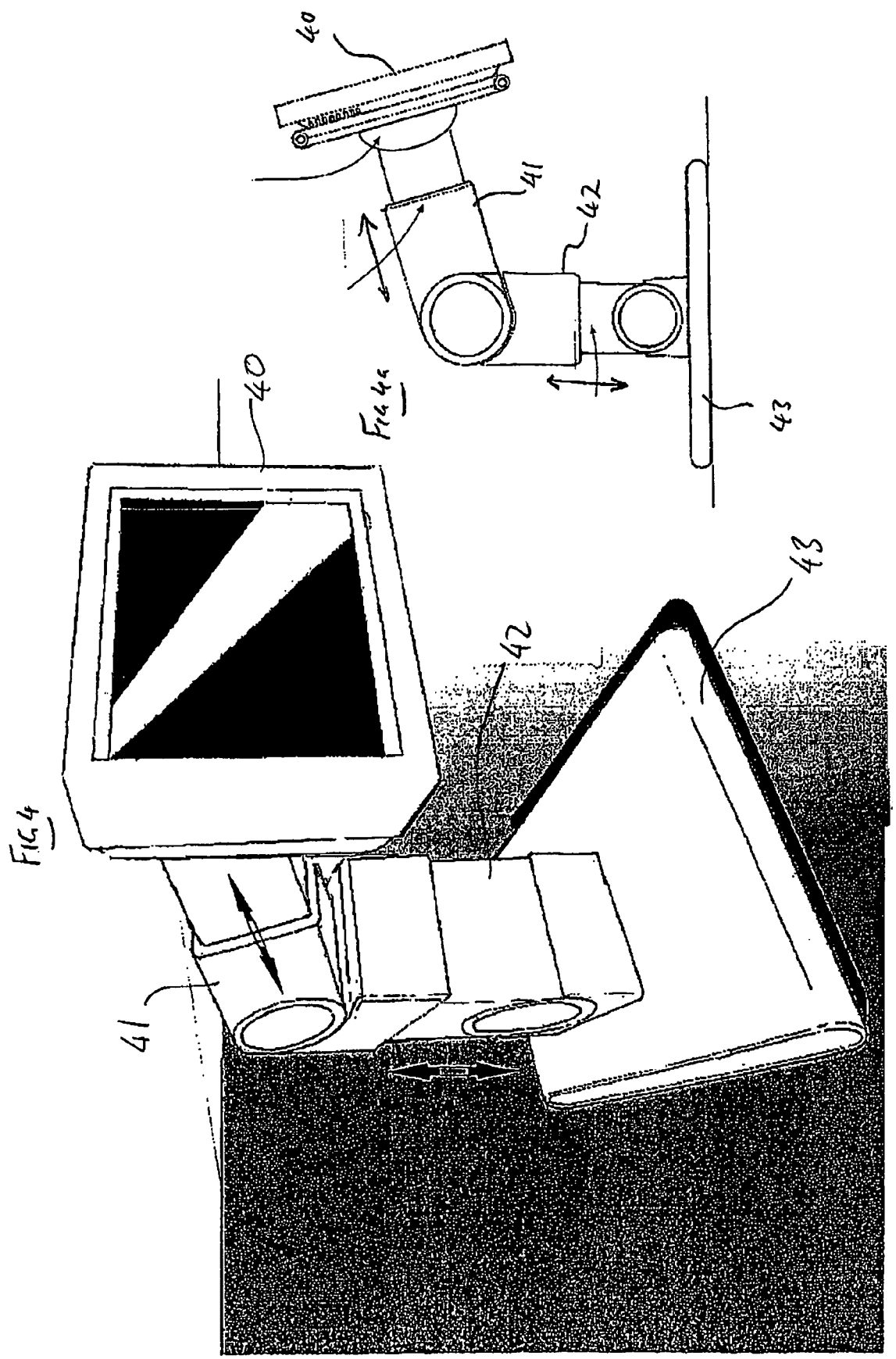

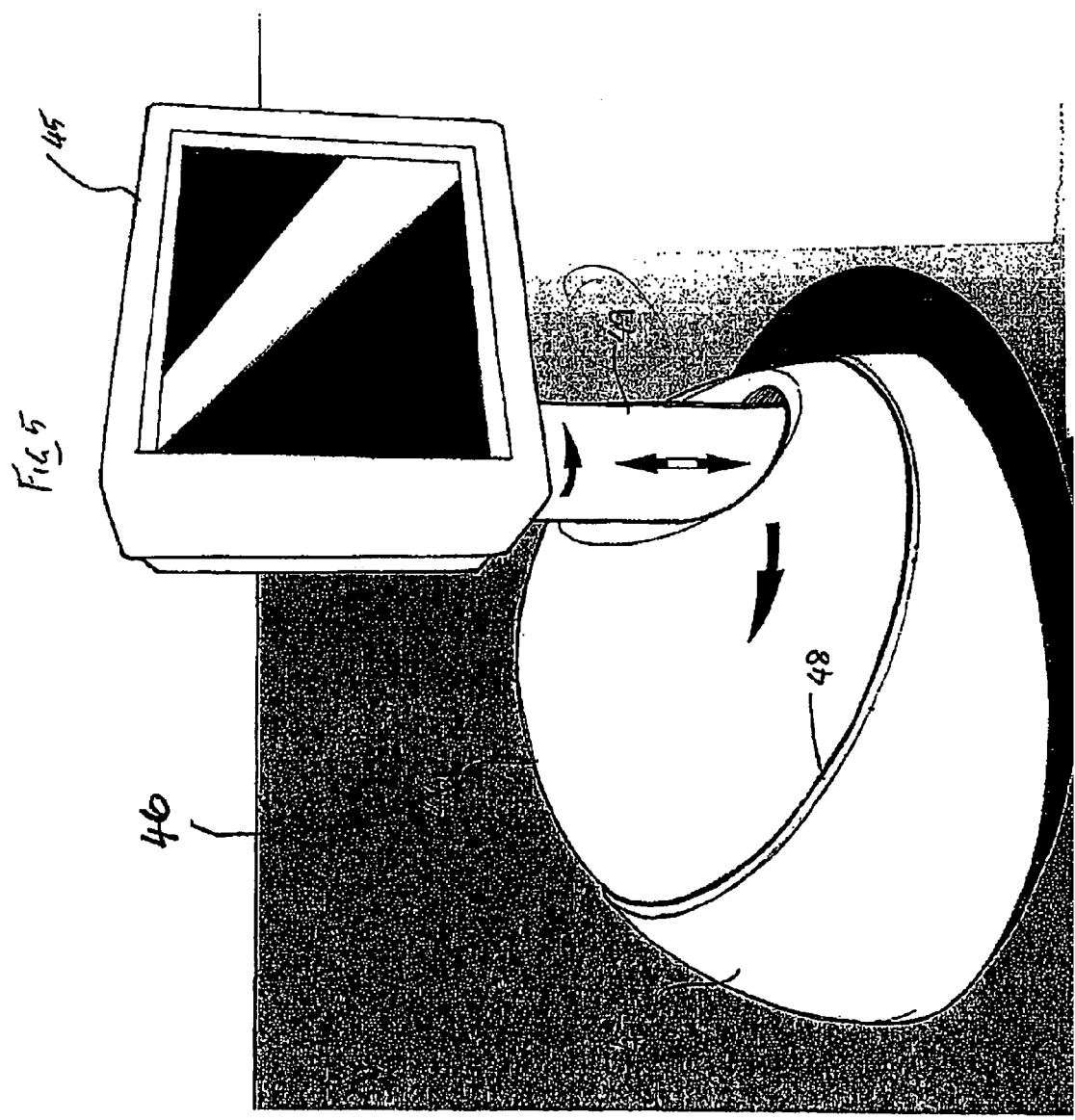

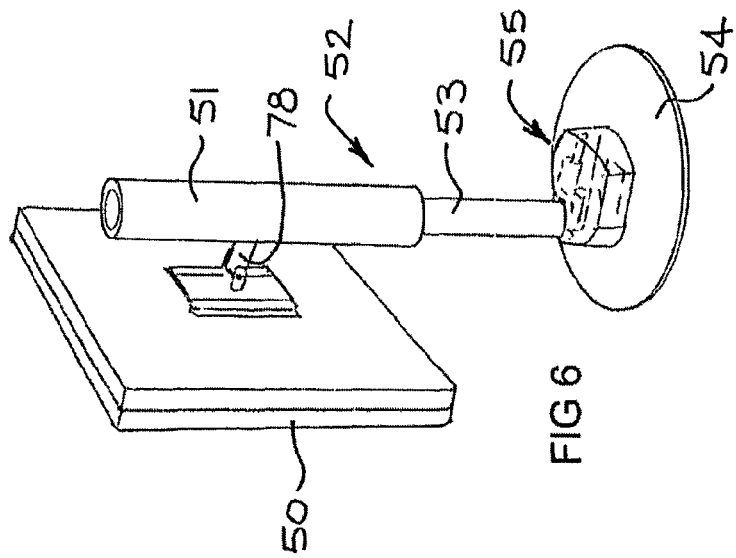
FIG 6
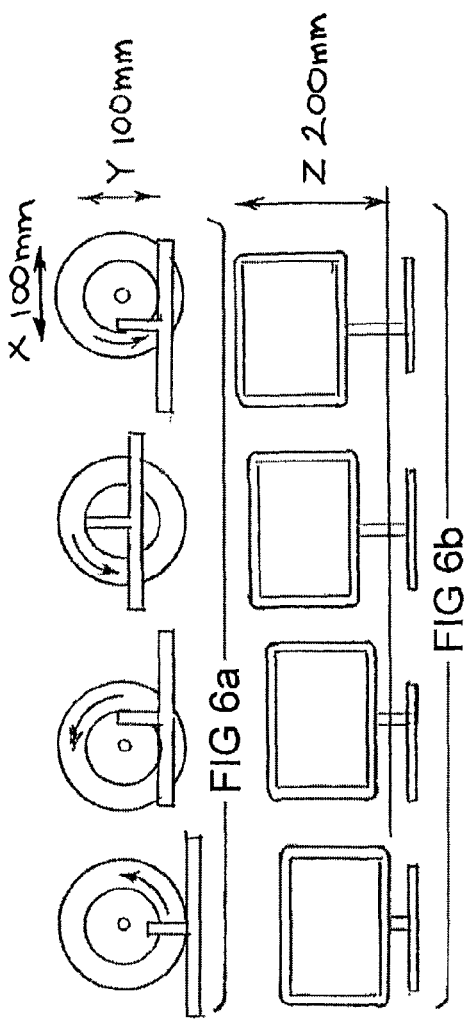
FIG 6a
FIG 6b
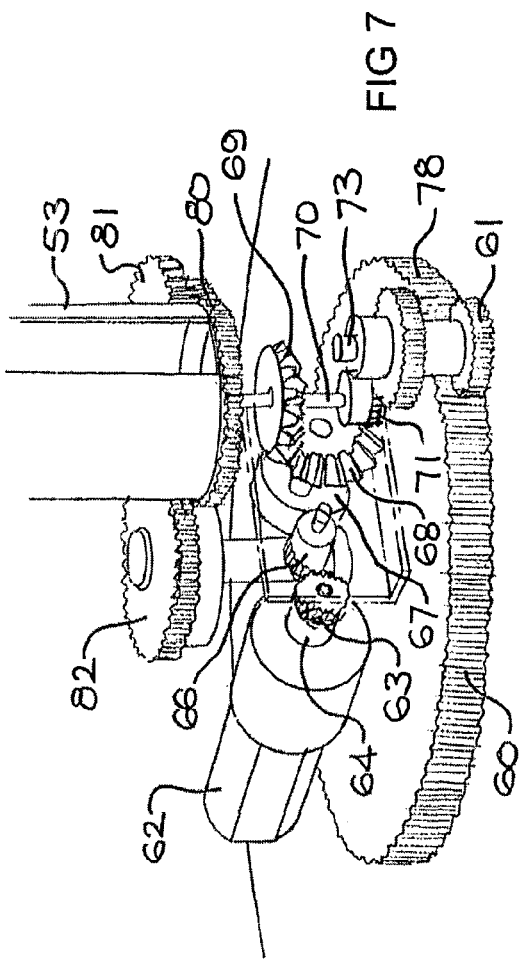
FIG 7

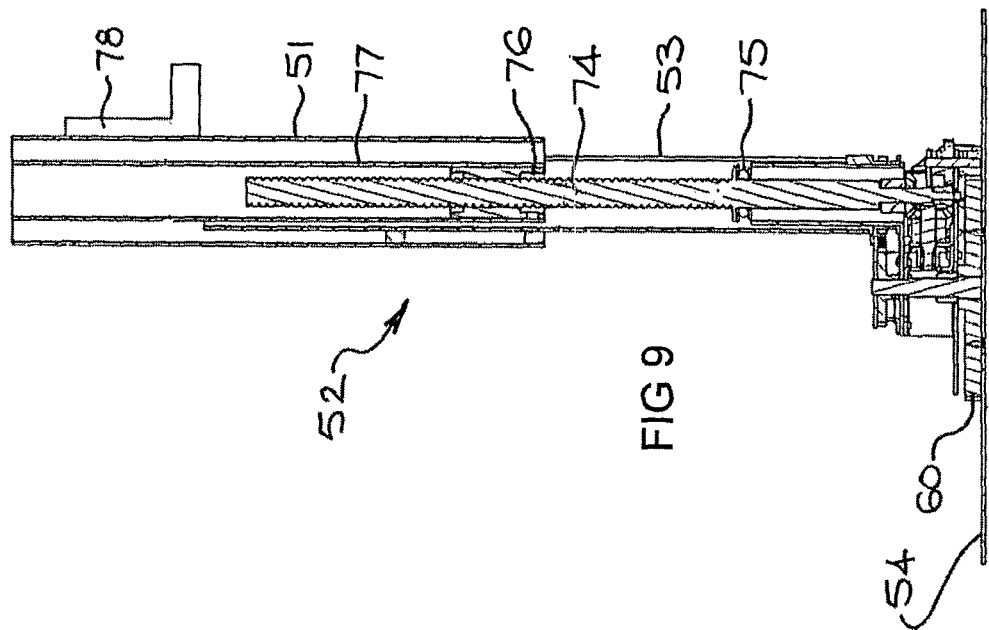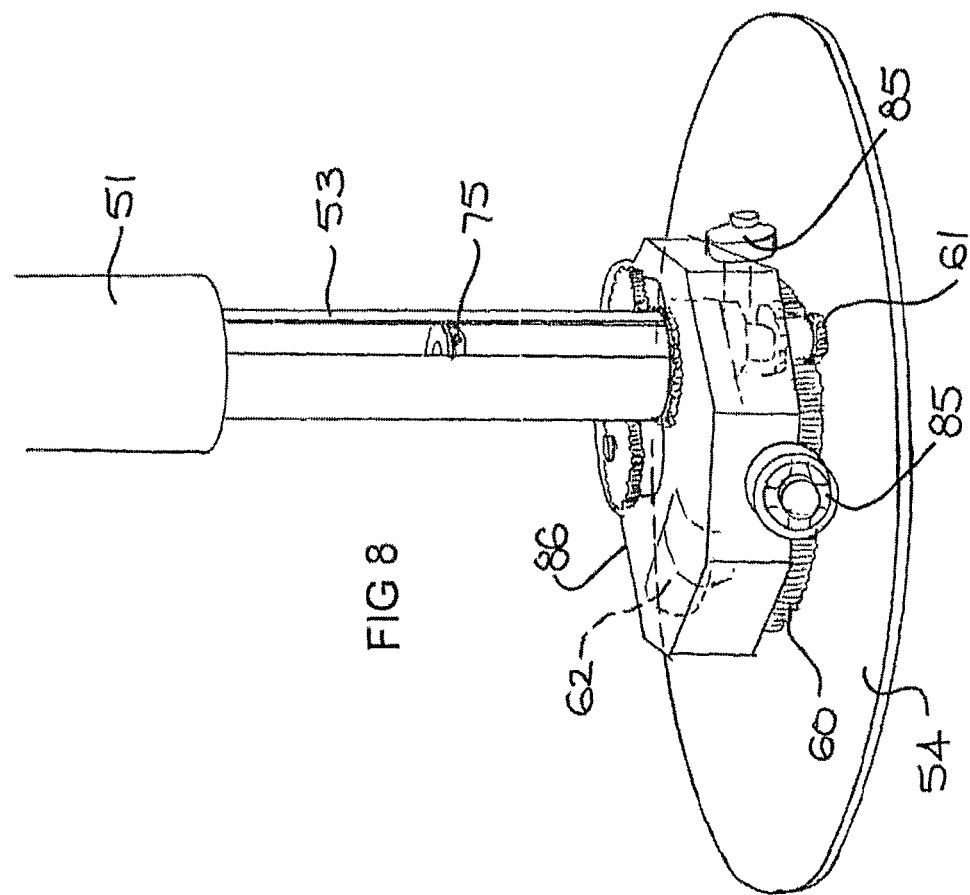

AUTOMATICALLY VARYING EQUIPMENT SUPPORT

CROSS-REFERENCE TO RELATED APPLICATIONS

This application is the National Stage of International Application No. PCT/AU2005/001745, filed on Nov. 18, 2005, which claims the benefit of Australian Application No. 2004906612, filed on Nov. 18, 2004. The contents of both applications are hereby incorporated by reference in their entirety.

FIELD OF THE INVENTION

This invention relates to a moveable support for workplace equipment.

BACKGROUND OF THE INVENTION

Ergonomics plays an important role in the workplace where machines are used. This is largely due to the problem of strain injuries associated with using machines for long periods of time in the same and similar position.

Adjustable chairs have been developed to maintain correct posture while using machines at a workstation. In the case of computers, manually adjustable computer monitors and supports have also been developed to maintain the user's correct posture during use of the computer.

Upper back and neck, and eye strain is a problem associated with using computer monitors for long periods of time. This is caused by the user's fixed posture and eyes focussing at a constant distance over a long period of time. This problem also arises in other types of work where the worker must maintain a particular posture or must focus at a fixed distance for prolonged periods. To alleviate upper back and neck, and eye strain, it is recommended that the user take a break from using the computer which allows for posture change and for the eyes to change focus by looking at objects at varying distances.

Many users either forget or are unwilling or are unable to take a break from using their computer. There exists computer software that reminds the user to take a break from the computer monitor by initiating a pop up reminder on the monitor advising the user to take a break. A problem with this approach is that it does not ensure that the user takes a break because the pop up reminder can easily be ignored. Another problem with this approach is that it is not compatible with non computerized workplaces in which upper back and neck, and eye strain can be a problem such as on a sewing machine or an assembly line in a factory.

While many different forms of adjustable computer stands exist, it is the case that the adjustability of these stands is static, i.e. they are adjustable to suit the particular person using the computer, but once the adjustment has been made, the position of monitor is fixed until another adjustment is made, say for another person who might use the same computer. Thus, the problems discussed above remain, even though the computer stand is adjustable.

The above discussion of background art is included to explain the context of the present invention. It is not to be taken as an admission that any of the material discussed was published, known or part of the common general knowledge at the priority date of this specification.

SUMMARY OF THE INVENTION

The present invention provides an equipment support for supporting a piece of equipment, the equipment support being operable to support the piece of equipment and including a drive arrangement to provide drive so that the position of the piece of equipment relative to a user of the equipment is automatically and continuously varied over time.

A variation in the position of the piece of equipment can include varying the distance and/or the angle of view between the equipment and the equipment user. Advantageously, the present invention ensures that the position of a piece of equipment is changing continuously so that, for example, a user's eyes do not focus on the equipment at a constant distance for a prolonged period. The present invention can thus assist to reduce or eliminate eye strain and additionally, it can assist to reduce or eliminate musculo skeletal disorders (MSDs), such as chronic aches and pains in necks, shoulders and backs. There is statistical data to indicate that MSDs contribute to at least 40% of known workplace injury in Australia, New Zealand and America. In Europe, it is estimated that more than 600 million days are lost each year due to MSD related ill health.

The invention principally will be described in relation to equipment in the form of computer, particularly computer monitors, but it could also apply to equipment and control consoles, sewing machines, ironing boards, manufacturing assembly lines/stations, high intensity occupations such as jewellery makers, and other activities.

In one arrangement of the invention, the piece of equipment can be supported on a track, with the equipment being moved transversely along the track by suitable movement means. Alternatively, movement means may push or pull the equipment, or lift or lower it as required and any mechanisms suitable to achieve this movement can be employed. In one arrangement, the present invention provides an equipment support including a support for supporting the equipment, and movement means for changing the position of the support over time. Alternatively, the equipment may be constructed for direct connection to suitable movement means and for example, the rear of a computer monitor may include facility for connection to a bracket connected to the movement means, or it may include threaded holes to receive screw fasteners which extend from the movement means. It is envisaged that the present invention may be embodied in the support, or form the support, of a computer monitor that is provided with a computer. For existing computers, it is envisaged that a retrofit assembly could be provided to replace the existing stand.

Preferably the movement means associated with the equipment support automatically and continuously changes the position of the piece of equipment over time. The rate of change can vary, or it can be a constant rate of change. Alternatively, the change in the position of the equipment can be incremental. In this latter arrangement, the time period between position changes can be customized for the particular equipment, but preferably the position change occurs relatively frequently. The distance the equipment is moved in each position change can vary or can be constant. The continuous movement embodied by the invention also includes within its scope, reversing movement when the piece of equipment has reached the limit of movement in one direction. For example, the invention includes within its scope linear movement of a piece of equipment to a position at which it reaches the end of the linear path and reverses its movement to return in the opposite direction.

It is preferred that the movement of the piece of equipment be substantially imperceptible to the equipment user. Thus the movement preferably is slow and in most cases, the actual extent of movement will be small. In one arrangement, a computer monitor will travel about 100 mm forward and back, and from side to side, and about 200 mm vertically.

Preferably, the movement means changes the position of the piece of equipment both generally vertically and towards and away from the equipment user, although the movement means could change the position of the piece of equipment in only the generally vertical orientation, or only towards and away or sideways from the equipment user. Different equipment and different users of the equipment may require different types of movement.

An advantage of automatic movement is that the equipment user is constantly readjusting their position or posture, or the focus of their eyes and this is expected to at least reduce or substantially eliminate upper back and neck, and eye strain. Also, because movement occurs without requiring effort or direct input of the user, the potential benefits of the invention are more likely to be achieved. Moreover, because movement preferably is very slow, there should be no actual change to the equipment user in the use or effectiveness of the computer.

The equipment support may include an upper and lower plate in which the upper plate supports the piece of equipment and the lower plate rests on, or is fixed to the surface of a table or bench or the like. The upper and lower plates can be joined by one or more arms that are pivotably mounted between the plates. The movement means can change the position of the upper plate by causing movement of the one or more arms relative to the lower plate. The upper and lower plates may alternatively comprise upper and lower frames, or a combination of a plate and a frame. The upper and lower plates or frames preferably are square or rectangular, although other shapes may be provided as required. For example, while the lower plate or frame may be square or rectangular, the upper plate or frame may be oval or circular.

Alternatively, the upper plate or frame may be joined directly to a supporting surface, such as a table or bench top, other framework, or the floor. In relation to computer monitors, the upper plate or frame may be joined by one or more arms to a table or bench top, or to the surface of a workstation. The table or bench top, or the work station, therefore may include fixtures suitable to connect to a plate or frame upon which a monitor is supported.

Still further, each of the table or bench top, or the workstation, and the computer monitor, may include fixtures suitable for connection by a support which could take the form of one or more arms. Thus, the upper and/or lower plates of the earlier embodiment would not be necessary.

In an alternative, the equipment support can include a base and one or more arms and the piece of equipment is connected directly to portions of the arm remote from the base, preferably at ends of the arm or arms. In this preferred arrangement, the moving means can be housed within the base and therefore be obscured from view.

The one or more arms may be telescopic or rotatably mounted, although a combination of rotational mounting and telescoping can be provided. Indeed any form of arm, and any form of arm movement which facilitates changing the position of the piece of equipment can be adopted. A telescopic arm can provide movement along a single axis, while an arm which is both telescopic and rotatably mounted, can provide movement along or about two or more axes. Rotational movement of the arm can be about its own lengthwise axis while the arm can be moved in a path, such as a circular path. The movement means may provide movement along a path which is circular or elliptical, or other shape as required.

The movement of the or each arm might therefore be in a circular path about a central axis, or an elliptical path or other suitable path, while the arm may itself be rotatable about its own lengthwise axis. In this arrangement, as the arm follows the path about which it is driven, it can be rotated so that a piece of equipment which is attached to it, such as a computer monitor, can be made to face toward the user no matter where the arm is along its path. For example, if the arm is rotated in a circular path about a central axis, the arm may be rotated 360° about its own axis to maintain the computer monitor facing the computer user.

The arrangement of the invention can be portable and free standing for location on any suitable surface, or it can be permanently or temporarily fixed to a suitable surface. The surface can be a flat and horizontal surface, or it can be other than that. The arrangement could, for example, be operable with an inclined surface, or a vertical surface, such as a wall. It may for example, be advantageous to mount a computer monitor to a wall to save desk space. In that arrangement, the equipment support could be fixed to the wall and still operate in a desired manner. Any suitable wall could be employed for that purpose, and for example office partitioning could provide such a surface. The arrangement could alternatively be operable with a frame, such as the frame of machinery in a production line. The arrangement can include suitable adaptors to facilitate use of the invention with different supporting structures.

The movement means may take any suitable form and may for example include a solenoid and a spring, with the solenoid attached to the spring and the spring attached to the support such as to an arm or arms. In this form, the solenoid and spring can move one or more arms to rotate such that the position of the support is changed.

Alternatively, the movement means may include a rack and pinion, the rack being attached to the support and the pinion attached to both the support and the rack, wherein the rack and pinion are adapted to move the rotatable arms again to change the position of the support.

In addition to the movement means discussed above the movement means may alternatively or additionally include a linear actuator on a rack, or a stepper motor on a rack and pinion.

The equipment support may further include a damping rod positioned between the upper and lower plates, or between the equipment and a supporting surface, such that the action of the movement means is dampened. Preferably, the damping rod is a gas spring, or alternatively a hydraulic spring.

The equipment support can alternatively include a gearing arrangement and a drive motor for example to drive an arm or arms in the manner required. Hydraulic or pneumatic power could also be employed for all or part of the movement required.

DESCRIPTION OF THE DRAWINGS

For a better understanding of the invention and to show how it may be performed, embodiments thereof will now be described, by way of non-limiting example only, with reference to the accompanying drawings. In the drawings, the same reference numerals identify the same or like components:

FIGS. 3 to 6 show alternative embodiments of the invention.

FIG. 7 is a detailed view of the gear arrangement of FIG. 6.

FIG. 8 is a detailed view of the gear arrangement and supporting column of FIG. 6.

FIG. 9 is a cross-sectional view of the gear arrangement and supporting column of FIG. 6.

DETAILED DESCRIPTION OF THE PREFERRED EMBODIMENTS OF THE INVENTION

The following description describes the equipment support in the context of a stand for a computer monitor. It should be appreciated that the support is intended to be used with any equipment that requires the user to remain in the same position and/or to focus his or her eyes at a constant distance over a long period of time. For example, the equipment support could be used in conjunction with reading material or with a sewing machine.

Figure 1:
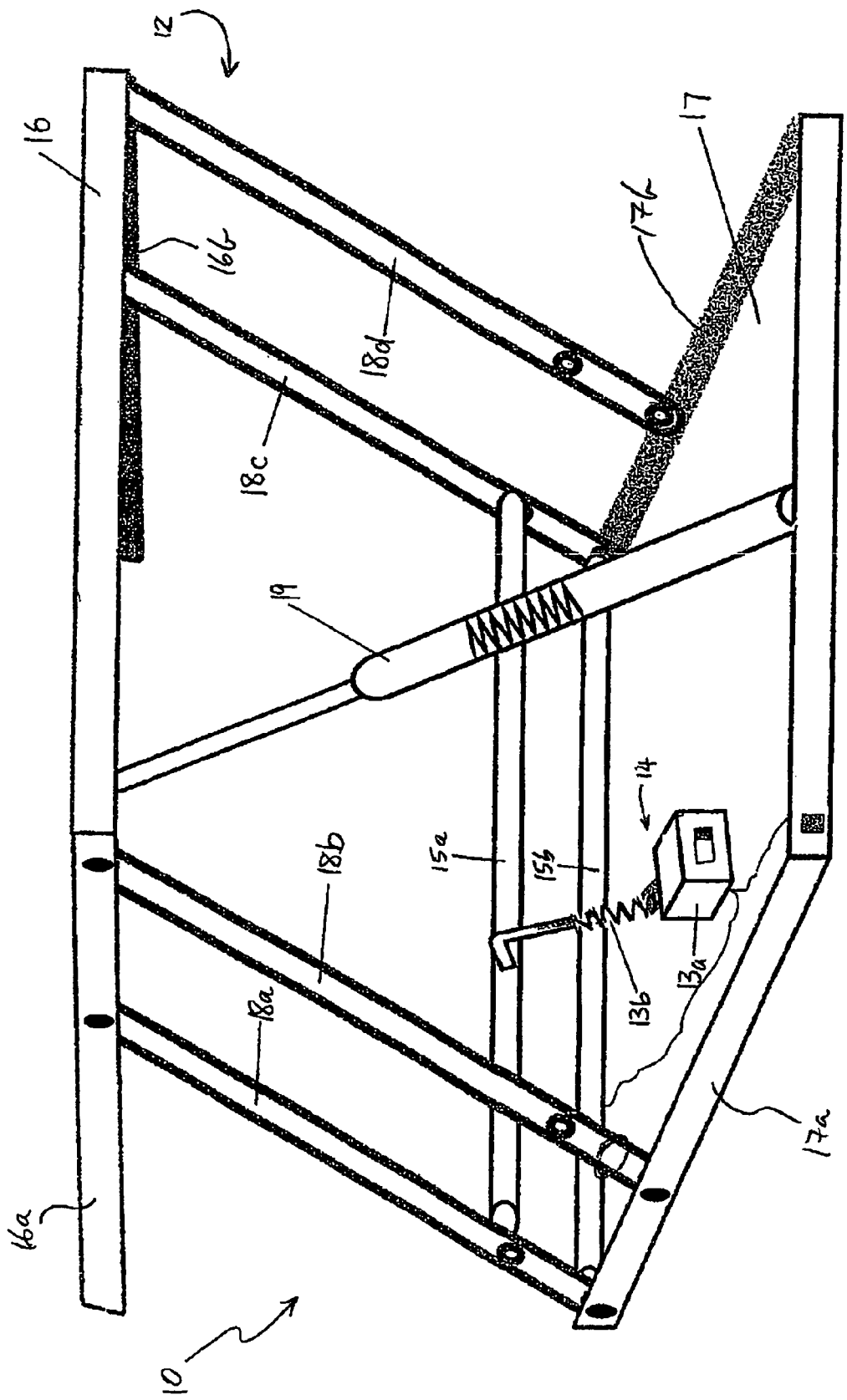
FIG. 1 is a perspective view of an equipment support according to a preferred embodiment of the invention.

Referring to FIG. 1 of the drawings, there is generally shown an equipment support 10. The equipment support 10 includes a support 12 for holding a computer monitor (not shown) and movement means 14 for changing the position of the support 12. The support 12 includes an upper and lower plate 16, 17, the upper and lower plate 16, 17 being joined by rotatably mounted arms 18a, 18b, 18c, and 18d mounted on opposite ends 16a, 16b, 17a, 17b of the upper and lower plate 16, 17. The support 12 further includes cross members 15a, 15b, cross member 15a being in engagement with movement means 14, and a damping rod 19 which controls the rate at which the movement means 14 changes the position of the support 12.

The movement means 14 of FIG. 1 includes a solenoid 13a shown schematically coupled to one end of a spring 13b. The other end of the spring 13b is attached to cross member 15a. The solenoid 13a is electrically connected to a power source (not shown). When electrically connected, the solenoid 13a can switch between two states, the "on" state and the "off" state. In the on state, the solenoid 13a retracts and in turn retracts the spring 13b which causes the rotatable arms 18a, 18b, 18c and 18d together with the upper plate 16 to be moved downwardly and toward a person positioned in front of the equipment support 10 before the upper plate 16 comes to rest over the lower plate 17.

In the off state the solenoid 13a extends and in turn compresses the spring 13b which causes the rotatable arms 18a, 18b, 18c and 18d together with the upper plate 16 to be moved in the reverse direction until the solenoid 13a reaches the end of its extension.

By the movement of the upper plate 16, it will be appreciated that a computer monitor supported thereon, will be shifted forwards and backwards, as well as up and down, as the solenoid shifts between its on and off states. The requirement or desirability of the spring 13b is to more gently, pull or push on the cross-member 15a than would be the case if the solenoid was connected directly to the cross-member 15a.

Figure 2A:
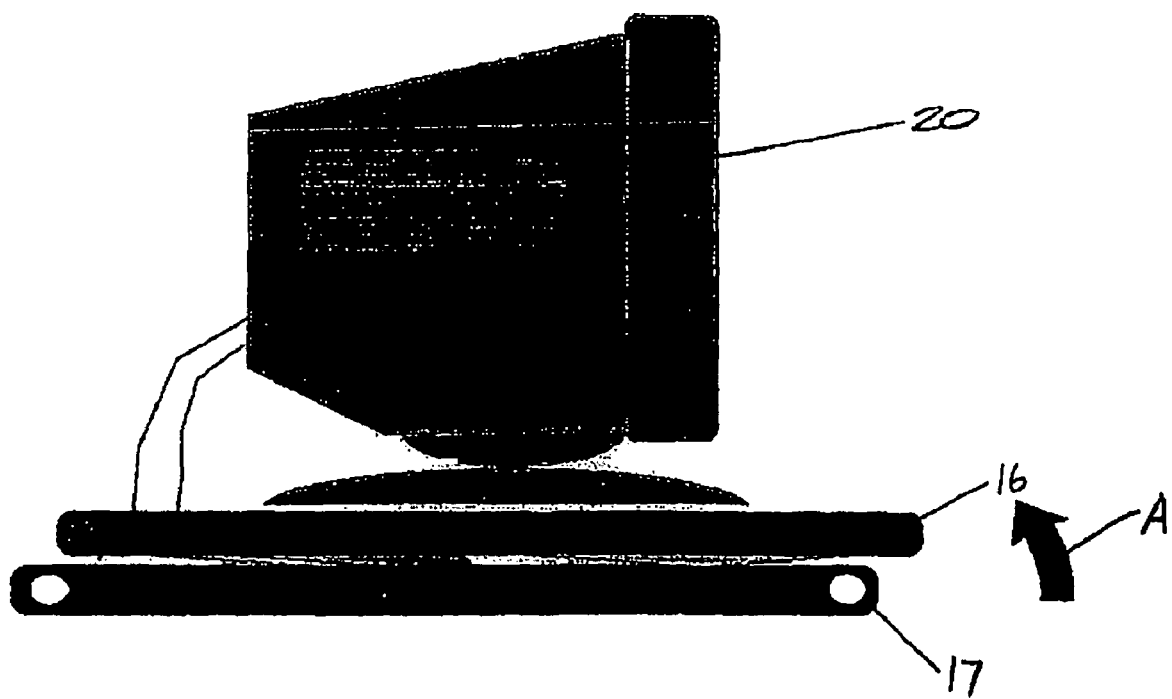
FIGS. 2a, 2b and 2c illustrate side-on views of an equipment support according to a preferred embodiment of the invention.
Figure 2B:
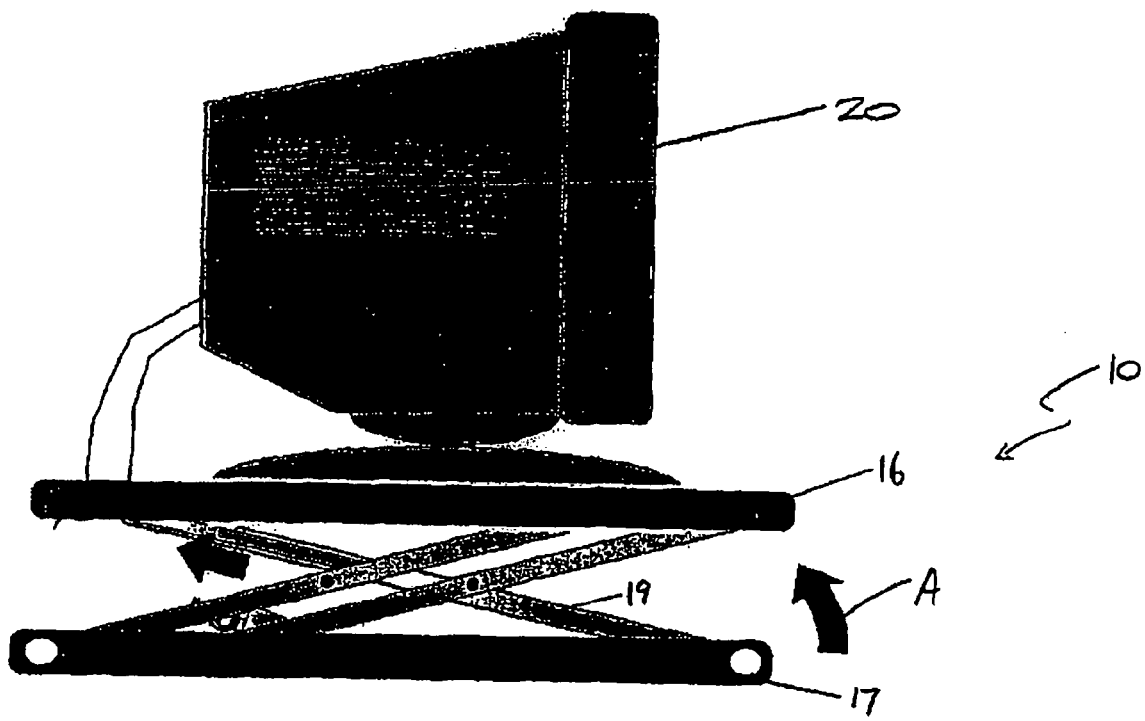
Figure 2C:
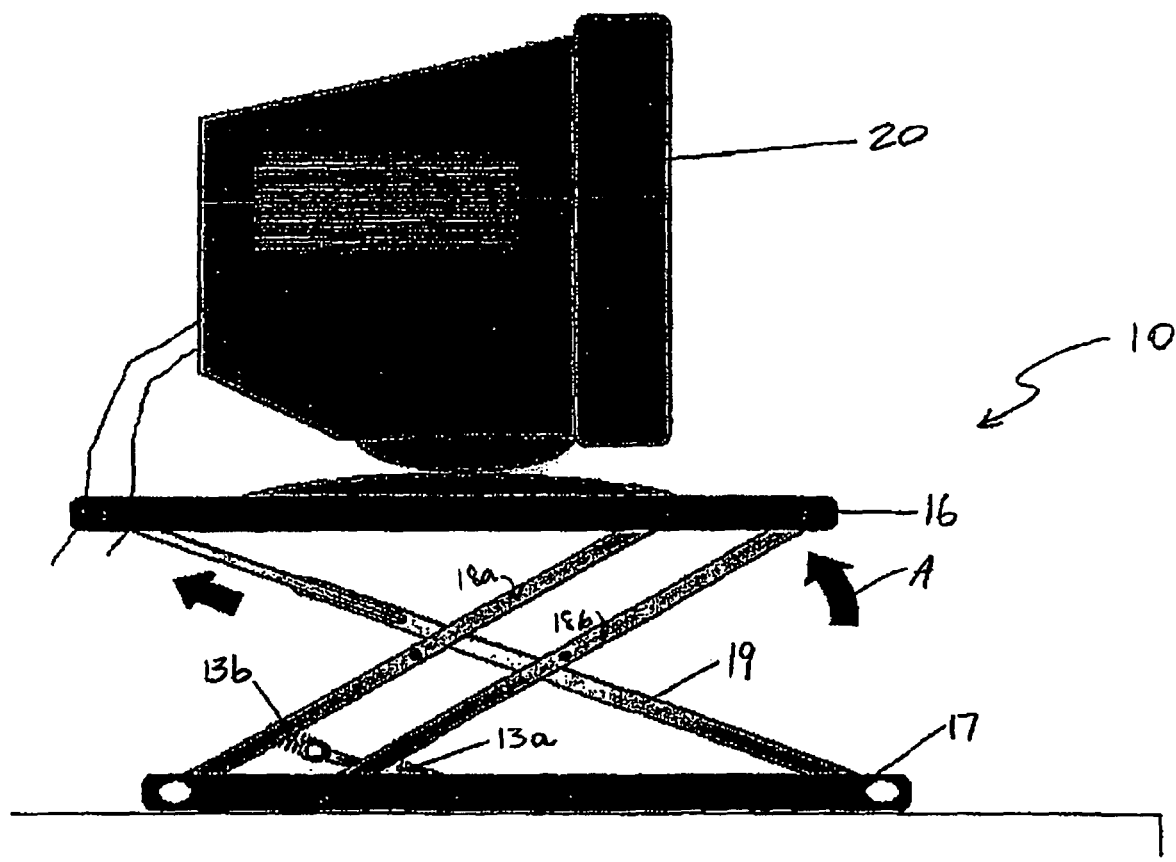

FIGS. 2a, 2b and 2c illustrate the equipment support 10 of FIG. 1 in use. In FIG. 2a, a computer monitor 20 rests on upper plate 16 of the equipment support 10 with the solenoid 13a in its off state. The computer monitor 20 is a VDU desktop monitor. However, the computer monitor could alternatively be a flat-screen type monitor. Still alternatively, a computer laptop may rest on the upper plate 16 in conjunction with a detachable keyboard.

As the user (not shown) is using the computer monitor 20, and with electricity being supplied to the solenoid 13a, the plunger of the solenoid 13a is extended to compress spring 13b against cross member 15a (as shown in FIG. 1) which causes the rotatable arms 18a, 18b, 18c and 18d together with the upper plate 16 to be moved upwardly and away from the user in the direction of the arrow A, to the position shown in FIG. 2b. Movement of the arms 18a to 18b by the solenoid 13a is dampened by the damping rod 19 which slows the speed at which the height and distance of the monitor 20 from the user is changed. The damping rod 19 can, for example, be a gas spring calibrated such that the time taken to raise the upper plate 16 to its maximum height is, for example, 15 minutes. This time is selected to ensure that the computer user is not readily aware of the movement of the computer monitor 20. Different motion and/or cycle settings may be pre-programmed and may be selected at the discretion of the user.

FIG. 2c shows the solenoid 13a at or approaching the end of its extension and therefore the maximum extension of the upper plate 16 above the lower plate 17 and away from the user. At this point, the solenoid 13a can be switched to the on position, so that it retracts and extends the spring 13b. The damping rod 19 again slows the movement of the upper plate 16 in the reverse direction over a suitable amount of time so that the user again does not notice the movement of the computer monitor 20 back toward the position shown in FIG. 2a.

The solenoid 13a may be powered by mains power or alternatively, if used with a computer, via the computer's Universal Serial Bus Port (USB). The solenoid 13a may be independent of the computer and simply continuously cycle through the on and off states, thus continuously changing the position of the monitor. Alternatively the solenoid 13a can be arranged to intermittently cycle through the on and off states to conserve power but still ensure that the user is not focusing on the computer monitor 20 for a long period of time. In a further alternative, computer software can control the amount of cycles of the solenoid 13a or the timing of the cycles.

It will be appreciated that the movement of the monitor 20 shown in FIGS. 2a to 2c includes no sideways movement lateral to that shown. However, the invention contemplates a combination of the movement shown and lateral movement.

An improved version of the present invention is illustrated in FIGS. 3 to 9.

FIG. 3 shows a computer monitor 30 which is attached at a rear side thereof to a pair of parallel arms 31 and 32. The arms extend downwardly from the monitor 30 into a mounting arrangement 33 which is fixed to a base 34. A motor drive housed in the base 34 is operable via a gearing arrangement, to cause the parallel arms 31 and 32 to move in a parallel motion, upwardly and downwardly. That motion is illustrated in FIGS. 3a to 3c. From those figures, it can be seen that the height of the monitor moves from an upper position shown in FIG. 3a to a lower position shown in FIG. 3c. Moreover, it will be appreciated that the movement is arcuate and the monitor 30 shifts from a position closest to a mounting arrangement 34 in FIG. 3a, to a position furthest away from that arrangement 33 in FIG. 3. Thus, the arrangement of FIG. 3 provides movement of the monitor 30 both vertically and backward and forward.

FIG. 4 illustrates an alternative embodiment of the invention in which a monitor 40 is attached to one end of a telescopic arm 41 and the arm 41 is pivotably attached to one end of a further arm 42. The other end of the arm 42 is attached to a base 43. FIG. 4a shows this arrangement in side view and the arrangement is such as to provide height adjustment through telescoping movement of the arm 42, forward and backward movement through telescoping movement of the arm 41, and sideways movement of the monitor 40 by connecting the monitor 40 to the end of the arm 41 via a rack and pinion arrangement. Thus the arrangement of FIG. 4 provides a further degree of movement in addition to that provided in the FIG. 3 arrangement by virtue of the sideways movement of the monitor 40. Also, by combining the telescopic movements of the arms 41 and 42, and by controlling the extent of movement of the two arms separately, greater flexibility compared to the FIG. 3 arrangement can be provided in respect of the path through which the monitor is continually moved.

Extension and contraction of the telescopic arms 41 and 42 can be controlled by DC motors which drive a rack and pinion gear arrangement, while a further DC motor can be arranged to drive the rack and pinion arrangement between the monitor 40 and the arm 41. Clearly other arrangements could be employed, such as hydraulic or pneumatic drive.

FIG. 5 illustrates a further embodiment of the invention in which a single DC motor can drive the arrangement so that the monitor 45 is moved vertically, forward and backwards and sideways. In the FIG. 5 arrangement, a rotatable base part 46 is mounted to a stationary base part 47. A rotatable column 49 is arranged to move with the base part 46 when it rotates relative to the base part 47 and the column 49 is also independently rotatable relative to the base part 46. The monitor 45 is connected to the upper end of the column 49.

A motor which is housed within the base part 47 is operable to drive the base part 46 to rotate and that movement results in the column 49 and the monitor 45 moving through a circular path, so that the monitor 45 moves in a forward and backward motion and in a sideways motion. Moreover, because the junction 48 between the base parts 46 and 47 is inclined, the column 49 is caused to rise up that junction to provide for vertical movement of the monitor 45.

To ensure that the monitor 45 stays facing in the correct direction throughout movement of the base part 46 and the column 49, a geared arrangement between the column 49 and the monitor 45 is provided to provide correctional rotation of the monitor 45 as the column 49 rotates.

A still further arrangement is illustrated in FIG. 6 and this arrangement provides similar movement to the arrangement of FIG. 5. In FIG. 6, a monitor 50 is mounted to an upper part 51 of an arm in the form of a column 52, while a lower part 53 is connected to a base 54 through a gearing arrangement 55. The upper and lower parts 51 and 53 are telescopic to provide for vertical movement of the monitor 50, while the gearing arrangement provides for circular movement of the column 52 about a central axis, while the column 52 is caused to rotate about its own axis to ensure that the monitor 50 always faces in the correct direction. FIGS. 6a and 6b show the range of movement of the monitor 50 upon rotation of the column 52 by the gearing arrangement 55 and it can be seen through these figures, that the monitor 50 moves sideways, forward and backwards, and vertically. In this particular embodiment, the maximum vertical movement is arranged to be 200 mm and a full rotation of the gearing arrangement 55 occurs every 37.5 minutes. At this rate, for each full rotation of the gearing arrangement 55, there is 75 mm of vertical movement of the monitor 50. Thus, full monitor movement through 200 mm takes 1 hr 40 min through to 2.66 rotations. Also in this embodiment, the diameter of the gearing is such that the column 52 has a maximum sideways movement of 100 mm and a maximum forwards and backwards movement of 100 mm.

In each of the embodiments of FIGS. 3 to 6, any suitable driving mechanism and/or gearing mechanism can be employed. In any form of the invention when used with a computer monitor, it is preferred that the drive be computer controlled, through the computer to which the invention is applied, and this has the additional benefit of allowing customization of the movement where necessary. For example, it may be that space restrictions limit the amount of movement in a certain direction and the computer programming can be customized to ensure that the movement remains within any restrictions which apply. Moreover, when the computer is switched off, the computer control can also disable the drive so that separate switching of the drive to an off position is not required. Still further, at times when the computer is idle, i.e. it is switched on but is not being used, the computer can again disable the drive, until such time as the computer is reactivated and the drive can resume.

Any suitable geared arrangement can be employed to drive any of the above embodiments in the desired manner. One example of a suitable drive arrangement is illustrated in FIGS. 7, 8 and 9 in relation to the arrangement illustrated in FIG. 6. FIG. 7 shows the electric motor and gear drive arrangement of FIG. 6 in detail, while FIG. 8 shows additional detail in relation to the construction and connection of the column 52 to the gearing arrangement 55.

Referring to FIGS. 7 and 8, the gearing arrangement 55 includes a turntable gear 60 which is fixed to the base 54 against rotation. The turntable gear 60 is in meshing engagement with a planet gear 61 which is driven through the remaining parts of the gearing arrangement 55 and by the electric DC motor 62.

The motor 62 has a gear 63 mounted on its output shaft 64 and the gear 63 drives a reversing gear 66 which in turn drives a further gear 67. The gear 67 is connected by a shaft to a bevel gear 68 which drives a meshing bevel gear 69. The bevel gear 69 is connected to a shaft 70 which rotates with the gear 69. Also connected to the shaft 70 is a gear 71 which drives a gear 72 which is connected to a shaft 73 on which the planet gear 61 is mounted. Thus through the gear train described above, the planet gear 61 is driven to rotate about the turntable gear 60 so that the circular rotating motion shown in FIG. 6a is achieved.

The shaft 70 extends upwardly into the lower part 53 of the telescopic column 52. That shaft is connected to the screw of a ball and screw arrangement. This arrangement is more clearly illustrated in FIG. 9.

In FIG. 9, the screw 74 extends through the upper and lower parts 51 and 53 of the column 52 and is supported at a lower end by a roller bearing 75. A nut 76 is disposed about the screw 74 and rotation of the screw 74 causes the nut 76 to shift upwardly or downwardly relative to the screw 74. The nut 76 is connected to an inner tube 77 which forms part of the upper part 51 of the column 52 and the inner tube 77 and therefore the upper part 51 moves upwards or downwards with the nut 76. FIG. 9 also illustrates a connecting bracket 78 which is used to connect a monitor to the upper part 51 and the connecting bracket 78 can also be seen in FIG. 6.

It will be appreciated that by the above discussion, the column 52 is rotatable about a circular path by the gearing arrangement 55, and that the upper part 51 of the column 52 can be raised and lowered relative to the lower part 53. By these arrangements, the position of the monitor 50 can be varied through forward and rearward movement, sideways movement, and vertically. However, it is necessary that the arrangement of the invention maintain the direction that the monitor faces throughout all of this movement. Thus, the geared arrangement includes a ring gear 80 which is in meshed engagement with a further gear 81 and that gear 81 is in meshed engagement with gear 82. The gear 82 is a fixed gear, while the gear 81 is an idler gear. As the gearing arrangement 55 drives the planet gear 61 clockwise about the turntable gear 60, the gear 82 turns relatively anticlockwise, thereby driving the idler gear 81 clockwise, which in turn drives the column 52, through the gear 80, clockwise. Careful selection of the gearing results in rotation of the column 52 sufficient to maintain the monitor 50 facing the computer user.

FIG. 8 further shows the provision of a pair of wheels 85 which are connected to a housing 86 that houses the gearing arrangement 55. The wheels 85 roll along the upper surface of the base 54 and facilitate smooth movement of the column 52 about its circular path.

It will be clear from the foregoing, that the invention can be embodied in a variety of different forms from the relatively simple arrangements disclosed in FIGS. 1 and 2, to the more complex arrangements disclosed in FIGS. 3 to 9. A common aspect of each of these embodiments, is that the computer monitor which is illustrated in the figures, is able to be driven in a continuous manner to vary its position. It is to be noted that as discussed earlier, that continuous movement may comprise an incremental movement, so that in relation to the FIG. 6 embodiment, the motor 62 may drive through the gear arrangement 55 in a stop-start manner, rather than being in a non-stop driving mode but the effect of the stop-start drive must be such that the monitor varies its position over time in a relatively continuous manner.

The invention described herein is susceptible to variations, modifications and/or additions other than those specifically described and it is to be understood that the invention includes all such variations, modifications and/or additions which fall within the spirit and scope of the above description.

The invention claimed is:

1. An equipment support for supporting a piece of equipment, the equipment support comprising: a drive arrangement operable to provide drive so that the position of the supported piece of equipment moves automatically and continuously along a three dimensional path relative to a user of the equipment, so that the position of the piece of equipment relative to the user is continuously varied over time, the three dimensional path including movement which is forward and away and side to side relative to the user and defining a path which is generally circular, oval or elliptical when viewed from above the piece of equipment and the three dimensional path further including vertical movement of the piece of equipment so that as the piece of equipment is moved through the generally circular, oval or elliptical path, it is also moved vertically, wherein the equipment support includes a base and an arm extending from the base, the arm including two telescopic arm sections, one of the arm sections being connectable to a piece of equipment and whereby relative telescopic movement between the arm sections facilitates raising and lowering of the piece of equipment.

2. An equipment support according to claim 1, wherein the position of the piece of equipment is varied with respect to the eyes of the user.

3. An equipment support according to claim 1, wherein the position of the piece of equipment is varied by moving it through a path which is symmetrical about a central point.

4. An equipment support according to claim 1, wherein the piece of equipment is a computer monitor.

5. An equipment support according to claim 1, wherein the equipment support includes a base and an arm extending from the base, the arm being connectable to a piece of equipment.

6. An equipment support according to claim 5, wherein the arm is a substantially vertically extending arm.

7. An equipment support according to claim 5, wherein the arm is pivotably connected to the base for pivoting relative to the base.

8. An equipment support according to claim 5, wherein the arm is drivable about a generally circular oval or elliptical path.

9. An equipment support according to claim 8, wherein the time taken to drive the arm about the path is between about 25 min and 50 min.

10. An equipment support according to claim 9, wherein the time taken to drive the arm about the path is between about 30 min and 40 min.

11. An equipment support according to claim 5, wherein a pair of arms are provided which are pivotably connected to a base and which are pivotably connectable to a piece of equipment, whereby the arms are drivable to pivot to swing the piece of equipment through a vertical arc.

12. An equipment support according to claim 11, wherein the arms are parallel to each other and remain parallel during pivoting movement.

13. An equipment support according to claim 11, wherein the pair of arms are drivable through a circular path.

14. An equipment support according to claim 1, wherein the continuous movement comprises continuous incremental movement of the piece of equipment.

15. An equipment support according to claim 1, wherein the piece of equipment has an orientation and a position relative to the user of the equipment and whereby the equipment support is operable to vary the position of the piece of equipment and to maintain the orientation of the piece of equipment relative to the user substantially constant.

* * * * *